United States Patent
Mack

(10) Patent No.: US 7,728,567 B1
(45) Date of Patent: Jun. 1, 2010

(54) CURRENT MODE PULSE FREQUENCY MODULATION SWITCHING REGULATOR

(75) Inventor: Michael P. Mack, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 516 days.

(21) Appl. No.: 11/627,907

(22) Filed: Jan. 26, 2007

(51) Int. Cl.
*G05F 1/59* (2006.01)
*G05F 1/565* (2006.01)

(52) U.S. Cl. .................. 323/271; 323/282; 323/285
(58) Field of Classification Search ............. 323/271, 323/272, 282–286
See application file for complete search history.

(56) References Cited

U.S. PATENT DOCUMENTS

| | | | |
|---|---|---|---|
| 5,548,206 A * | 8/1996 | Soo ............... | 323/284 |
| 6,316,926 B1 * | 11/2001 | Savo et al. ............. | 323/282 |
| 6,788,038 B1 * | 9/2004 | Bell et al. ............. | 323/284 |
| 7,102,340 B1 * | 9/2006 | Ferguson ............. | 323/284 |
| 7,446,519 B2 * | 11/2008 | Low et al. ............. | 323/285 |
| 2005/0194945 A1 * | 9/2005 | So ............... | 323/222 |
| 2007/0145961 A1 * | 6/2007 | Hasegawa et al. ............. | 323/282 |

OTHER PUBLICATIONS

Lenk, John D. (1999). "Circuit Troubleshooting Handbook" p. 242. McGraw-Hill, New York.*

* cited by examiner

*Primary Examiner*—Jeffrey L Sterrett
*Assistant Examiner*—Fred E Finch, III
(74) *Attorney, Agent, or Firm*—Bever, Hoffman & Harms, LLP; Jeanette S. Harms

(57) ABSTRACT

A method of providing current mode pulse frequency modulation (PFM) for a switching regulator can include resetting a driver input for a fixed duration when a first current in the driver reaches a first value set by an error amplifier output. The first current can be associated with PMOS switching transistors in the driver. The method can also include setting the driver input signal for the same fixed duration when a second current in the driver reaches a second value. This second current can be associated with NMOS switching transistors in the driver. In one embodiment, the driver can be tristated to ignore both the resetting and the setting. Using this method, perturbations of the inductor current can be substantially corrected and have limited impact on the current waveform beyond the cycle in which they occur.

10 Claims, 5 Drawing Sheets

CURRENT MODE PULSE FREQUENCY MODULATION SWITCHING REGULATOR

FIELD OF THE INVENTION

Current mode pulse frequency modulation (PFM) simplifies switching regulator loop dynamics without the need for slope compensation and without restrictions on output voltage and external components.

BACKGROUND OF THE INVENTION

Switching regulators can be used to convert an unregulated voltage to a desired, regulated DC voltage. FIG. 1 illustrates a schematic of a simple switching regulator 100 including an error amplifier 101 (e.g. a $g_m$ amplifier or another amplifier having a high output impedance), a modulator 102, a switching element 103, an LC filter 104, a load 105, and a compensation circuit 106.

In switching regulator 100, modulator 102 drives switching element 103 to provide one of VDD or VSS to LC filter 104. Specifically, a PMOS transistor 103A of switching element 103 is turned on (and an NMOS transistor 103B is turned off) to couple VDD to the input of inductor L of LC filter 104, thereby generating a ramped current through that inductor. At another point in time, NMOS transistor 103B is turned on (and PMOS transistor 103A is turned off) to couple VSS to the input of inductor L, thereby causing the current to ramp down until the start of a new switching cycle.

The amount of time that switching element 103 is "on" (i.e. PMOS transistor 103A being turned on) versus the total period is called the duty cycle. The duty cycle determines the output voltage Vout at a particular load current. Note that the capacitor C and the inductor L of LC filter 104 are sized to reduce voltage ripple of Vout. Load 105 is shown as a resistor R for purposes of illustration.

Error amplifier 101 receives voltage Vout on its negative input terminal and a reference voltage REF on its positive input terminal. Compensation circuit 106, which includes a resistor and a capacitor in this embodiment, is connected to the output terminal of error amplifier 101. In this configuration, error amplifier 101 can modify its output based on the difference between voltage Vout and reference voltage REF. The output of error amplifier 101 is provided to modulator 102, which can change the duty cycle of switching element 103 to minimize such difference.

There are numerous challenges in switching regulator design. The most basic challenge is obtaining a stable frequency response without undue restriction on external inductor and capacitor types/values (i.e. with respect to LC filter 104). This problem arises because LC filter 104 has two potentially low frequency poles (provided by inductor L and capacitor C) well below the unity gain bandwidth of switching regulator 100. Notably, if error amplifier 101 provides high gain, as can the case when using voltage mode pulse width modulation (PWM) for switching regulator 100, then error amplifier 101 introduces yet another low frequency pole.

To compensate for the three low frequency poles, a designer must include at least two zeros wherein compensation circuit 106 provides only one zero (via the resistor and capacitor therein). In one embodiment, the second zero can be designed into a more complex error amplifier 101. Alternatively, the designer can rely on the ESR (equivalent series resistance) of capacitor C in LC filter 104 to introduce the second zero (note that the capacitor C actually includes some parasitic resistance, which at some high frequency provides an additional zero). This option is simpler than designing a new error amplifier, but places restrictions on the type of capacitor that can be used by a customer in LC filter 104. If the customer fails to adhere to such restrictions, the loss and output ripple of switching regulator 100 may undesirably increase. Further, the wrong type of capacitor in LC filter 104 can even cause regulator instability.

Current mode PWM was developed to simplify switching regulator loop dynamics. FIG. 2 illustrates a switching regulator 200 using current mode PWM (note that elements having an identical or substantially identical function are labeled with the same reference numbers). In current mode PWM, switching regulator 200 uses a current loop 201 to control the inductor current and a voltage loop 202 to control the output voltage (described in reference to switching regulator 100 in FIG. 1).

In this embodiment, the inductor current is sensed with a small resistor Rsense and a current sense amplifier 203 having input terminals connected to both terminals of resistor Rsense. The output terminal of current sense amplifier 203 is connected to a negative input terminal of a PWM comparator 204 via current loop 201. The positive input terminal of PWM comparator 204 is coupled to the output terminal of error amplifier 101 via a summing block 208 (described in further detail below). The output terminal of PWM comparator 204 is connected to a reset terminal of a set/reset circuit 205. A set terminal of set/reset circuit 205 receives an oscillator signal 206. The output terminal of set/reset circuit 205 is buffered by a driver 207, which has an output terminal connected to resistor Rsense. Note that driver 207 can perform the functions associated with switching element 103 (FIG. 1), whereas PWM comparator 204, set/reset circuit 205, current sense amplifier 203, and resistor Rsense can perform the functions associated with modulator 102.

In this configuration, set/reset circuit 205 sets the PWM output periodically (using oscillator signal 206) and only resets the PWM output when the peak inductor current reaches a value set by voltage loop 202. Because the inductor current can be effectively controlled, the inductor current does not play a role in the loop dynamics. Therefore, from a small signal perspective, the inductor current can be replaced with a transconductance equal to 1/Rsense. As a result, good phase margin can be achieved with a single compensating zero and the ESR of capacitor C (in LC filter 104) is not restricted.

Unfortunately, current mode PWM suffers from an additional problem. Specifically, current loop 201 is unstable if the PWM duty cycle is greater than 50%. The duty cycle is determined by the regulator input voltage, output voltage Vout, and to a lesser extent the amount of power delivered to load 105. For duty cycles greater than 50%, the instability of current loop 201 can cause an undesirable sub-harmonic oscillation in the PWM and output voltage waveforms.

A technique called slope compensation was developed to mitigate this sub-harmonic oscillation. In switching regulator 200, summing block 208 can perform such slope compensation by introducing a periodic saw-tooth waveform to the output of error amplifier 101 (and thus to the input of PWM comparator 204). If the slope of the saw-tooth waveform is set properly, then inner loop 201 can be critically damped so that perturbations of the inductor current are corrected within a single cycle.

The correct slope for critical damping depends on the derivative of the inductor discharge current, which in turn depends on the output voltage Vout and the inductance L. That is, slope compensation works best if the slope of the saw-tooth waveform matches a value that depends on the output voltage Vout of inductor L. This matching requirement can place undesirable restrictions on both the output voltage Vout and the inductance L for a given switch regulator design. Moreover, to produce a saw-tooth waveform (and other necessary waveforms at appropriate points in the rest of the control circuit, not described herein), current mode PWM may require the design of complicated circuitry, e.g. summing block 208.

Note that if the slope compensation of summing block 208 is not set properly, then many cycles of oscillator 206 may be required for transients (i.e. current perturbations) to settle. Because of these additional cycles, voltage loop 202 must have a lower bandwidth than otherwise necessary.

Therefore, a need arises for a switching regulator that simplifies switching regulator loop dynamics without the need for slope compensation and without restrictions on output voltage and external components.

SUMMARY OF THE INVENTION

A method of providing current mode pulse frequency modulation (PFM) for a switching regulator is described. In this method, a driver input can be advantageously reset for a fixed duration when a first current in the driver reaches a first value. This first value can be set by an error amplifier output and at least one of a positive over-current condition and a negative over-current condition. The first current can be associated with a set of first type switching transistors (e.g. the PMOS switching transistors) in the driver. In one embodiment, resetting the driver input can include comparing the error amplifier output with a first type current signal (e.g. psen) associated with the set of first type (e.g. PMOS) switching transistors in the driver. The driver on-time can then be adjusted until the desired output voltage is reached.

The method can also include setting the driver input signal for the fixed duration when a second current in the driver reaches a second value. This second current can be associated with a set of second type switching transistors (e.g. NMOS switching transistors) in the driver. In one embodiment, the driver can generate the second value. In another embodiment, the method can also include tristating the driver to ignore both the resetting and the setting.

Because of the fixed duration of the resetting operation, perturbations of the inductor current can be substantially corrected. Moreover, these perturbations have limited impact on the current waveform beyond the cycle in which they occur. As a result, a current control loop of the switching regulator (described below) can have very high bandwidth and is unconditionally stable.

A switching regulator implementing the above-described PFM mode can include a driver circuit, an error amplifier, a PFM comparator, a timer circuit, and an LC filter. The driver circuit can receive a PFM signal and respond by turning on a set of first type (e.g. NMOS) switching transistors and turning off a set of second type (e.g. PMOS) switching transistors.

The error amplifier can receive a first reference voltage and a voltage control loop signal on its input terminals as well as a voltage limit signal on its control terminal. The voltage limit signal, which is a first current control loop signal generated by the driver circuit, sets a maximum output voltage of the error amplifier. The PFM comparator can receive an output of the error amplifier and a second current control loop signal generated by the driver circuit. The timer circuit can receive a reset signal generated by the PFM comparator and other current control loop signals generated by the driver circuit. Advantageously, the timer circuit generates the PFM signal based on a steady state mode, a positive over-current condition, and a negative over-current condition. The LC filter can receive an output of the driver circuit and generate the voltage control signal.

The timer circuit can include first and second timers as well as a negative current limit comparator. The first timer can receive the reset signal. The negative current limit comparator can receive the other current control loop signals, which are used to determine the negative over-current condition. The second timer can receive a set signal generated by the negative current limit comparator. A set of logic gates can receive outputs of the first and second timers and generating the PFM signal. In one embodiment, the first and second timers generate one-shot signals when triggered. In one embodiment, the error amplifier and the PFM comparator determine the positive over-current condition.

DETAILED DESCRIPTION OF THE FIGURES

Figure 1:
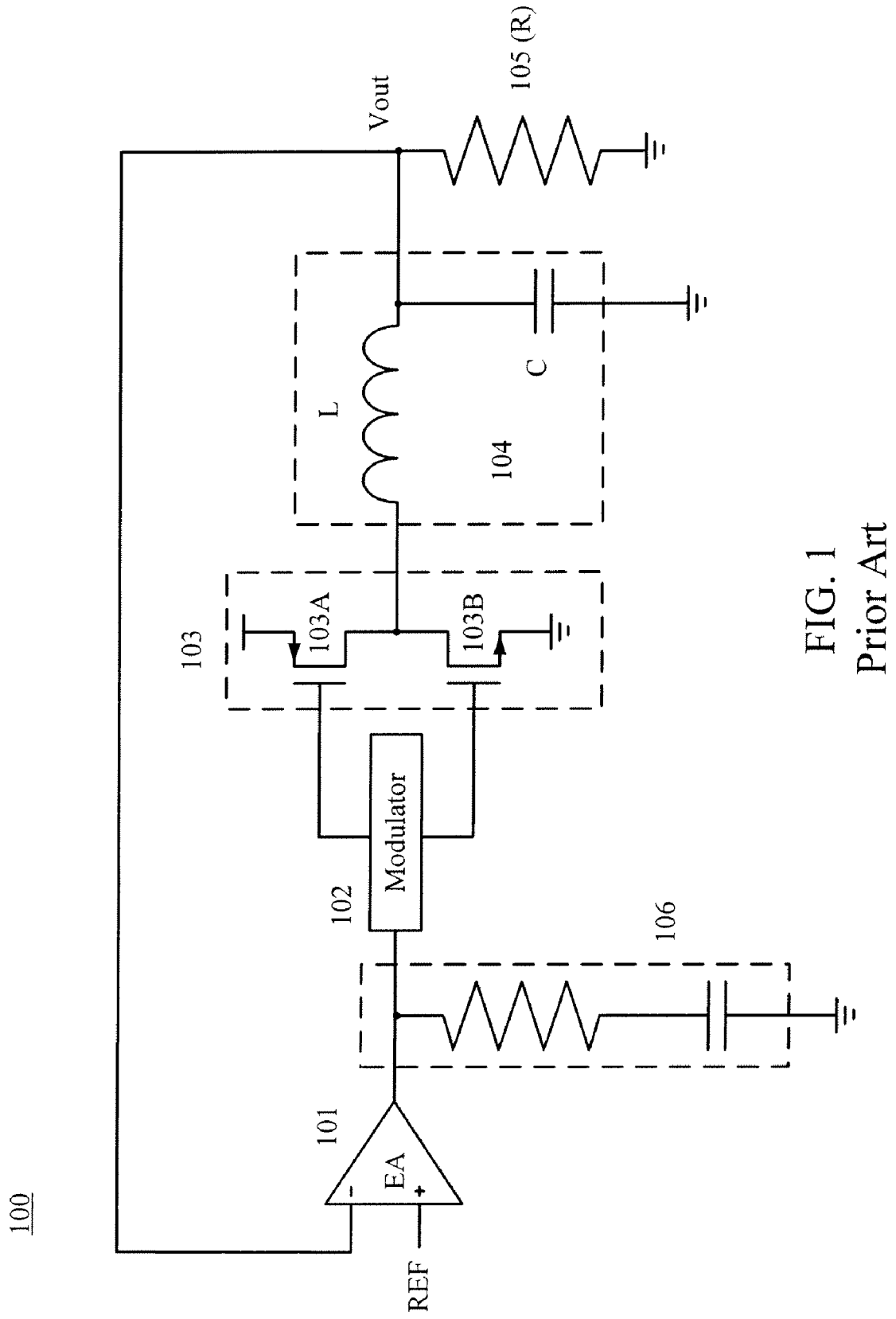
FIG. 1 illustrates a generic switching regulator.
Figure 2:
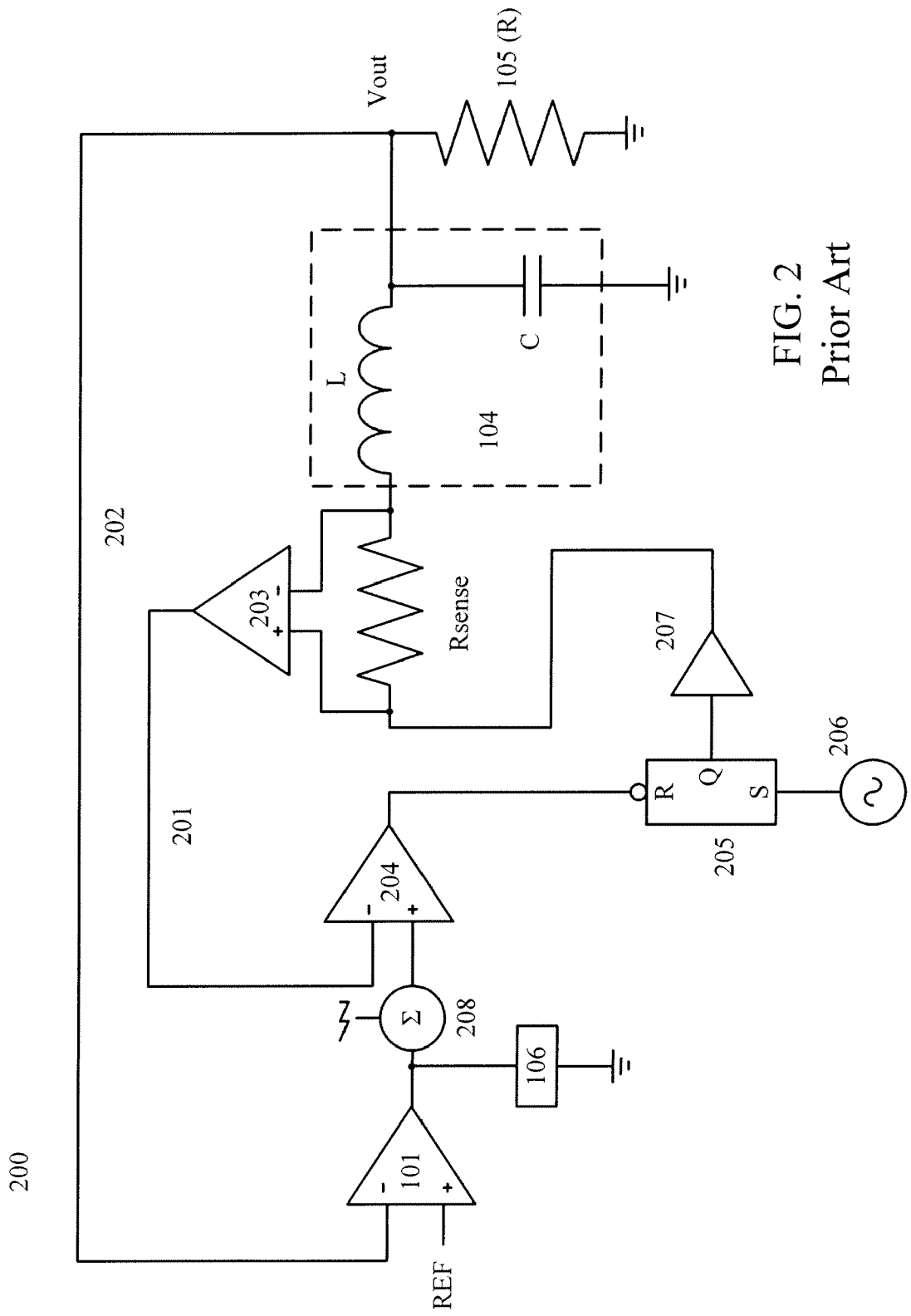
FIG. 2 illustrates a switching regulator configured for current mode pulse width (PWM) modulation.
Figure 3A:
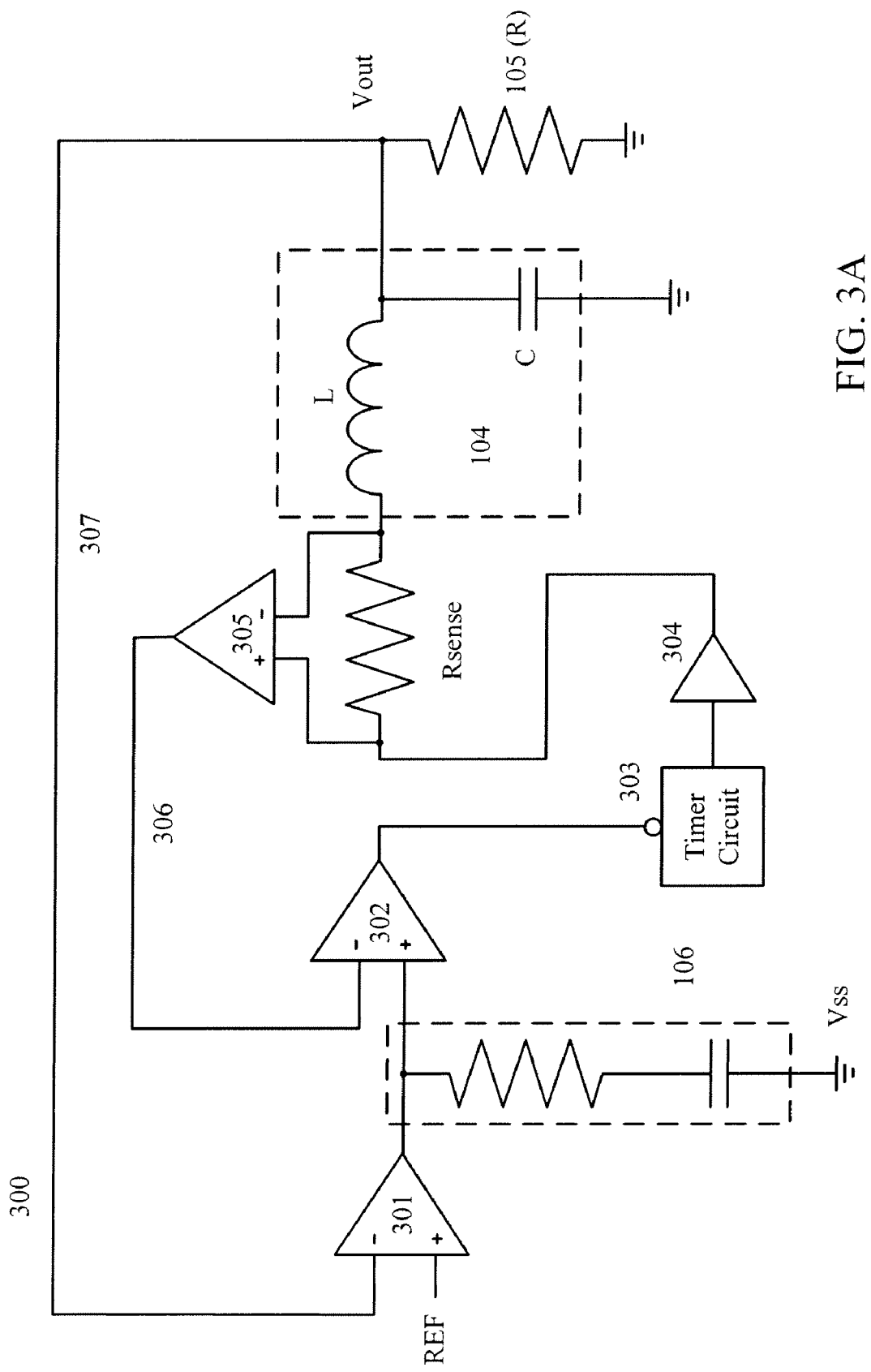
FIG. 3A illustrates a switching regulator configured for current mode pulse frequency (PFM) modulation.

In accordance with one aspect of the invention, a switching regulator can be configured for current mode pulse frequency modulation (PFM). This switching regulator can advantageously simplify switching regulator loop dynamics without the need for slope compensation and without restrictions on output voltage and external components. FIG. 3A illustrates a switching regulator 300 configured for current mode PFM (note that elements having an identical or substantially identical function are labeled with the same reference numbers).

In switching regulator 300, a voltage loop 307 can be used to control the output voltage and a current loop 306 can be used to control the peak inductor current. Voltage loop 307 provides the output voltage Vout to the negative input terminal of an error amplifier 301 whereas inner feedback loop 307 connects the output terminal of a current sense amplifier 305 to the negative input terminal of a PFM comparator 302. Notably, a timer circuit 303 receives the output of PFM comparator 302 and provides an output to driver 304. (Typically, any error amplifier described herein can be implemented as a transconductance amplifier or any other amplifier having a high output impedance.)

In this configuration, and described in further detail below, the output of PFM comparator 302 resets timer circuit 303 for a fixed duration (generically referenced as $t_{fixed}$) when the current reaches a value determined in part by the output of error amplifier 301. Thus, PFM comparator 302 can use timer circuit 303 to adjust the duty cycle of driver 304 until the desired output voltage Vout is reached.

Because $t_{fixed}$ is a predetermined duration, driver 304 can advantageously fully correct perturbations of the inductor current using the output of timer circuit 303 in only one cycle.

Hence, current loop 306 can have a very high bandwidth and provides unconditional stability.

Further, because switching regulator 300 can effectively control the inductor current, the inductor current does not play a role in the loop dynamics. Therefore, from a small signal perspective, the inductor current can be replaced with a transconductance equal to 1/Rsense. As a result, good phase margin can be achieved with a single compensating zero (as can be provided by compensation circuit 106) and the ESR of capacitor C (in LC filter 104) is not restricted.

Moreover, because current loop 306 provides unconditional stability, the need for slope compensation in switching regulator 300 is eliminated. Thus, advantageously, a designer can freely select the output voltage Vout and inductance L according to other requirements.

Figure 3B:
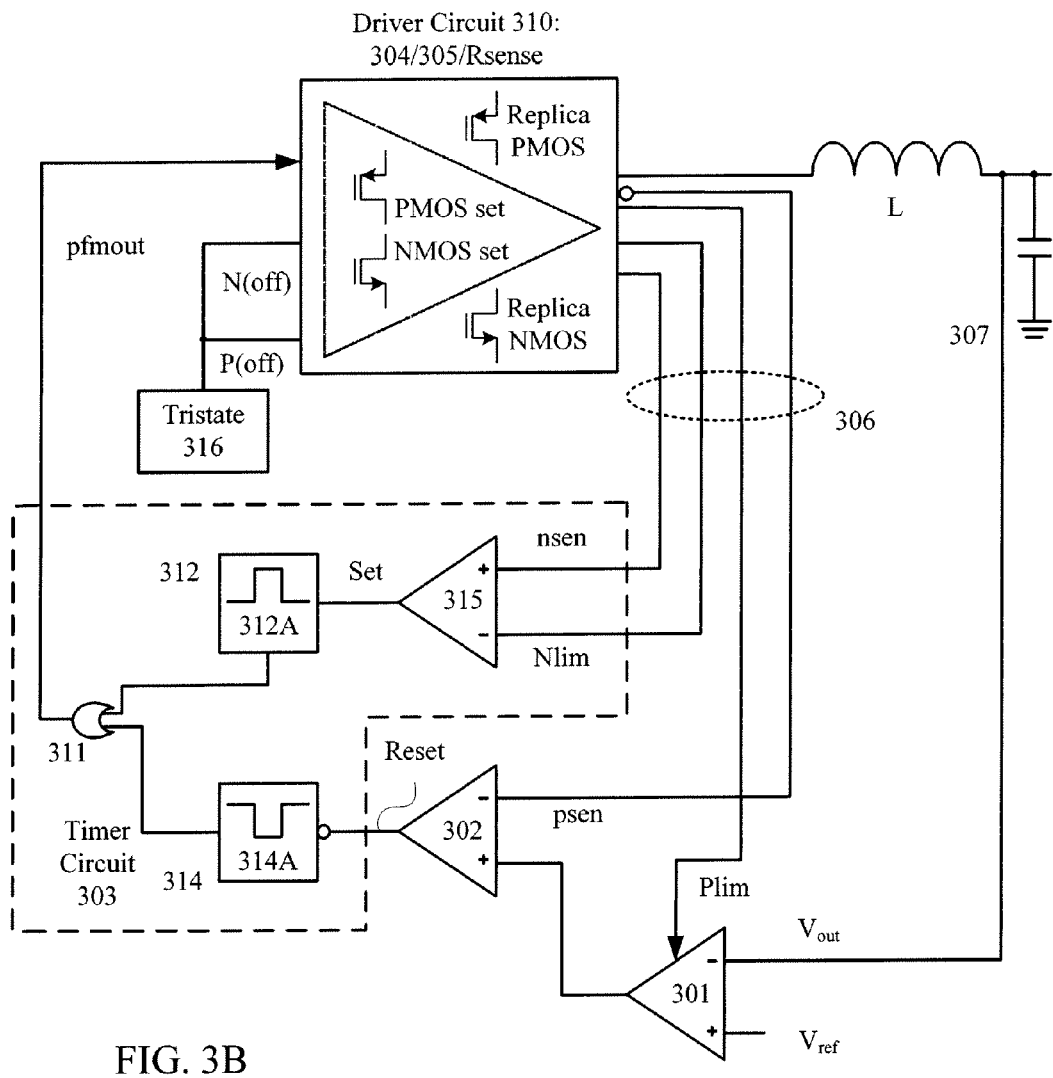
FIG. 3B illustrates various components of the timer circuit of FIG. 3A in greater detail.

FIG. 3B illustrates various components of timer circuit 303 in greater detail. Note that in this embodiment, a driver circuit 310 can include components for implementing the functionality of driver 304, current sense comparator 305, and resistor Rsense (all of FIG. 3A). Thus, for example, although a resistor Rsense is shown in FIG. 3A, any component providing a resistance (e.g. one or more transistors in a conducting state) can be included in driver circuit 310 to provide this functionality. Moreover, in this embodiment, current loop 306 can include multiple lines that provide input signals to PFM comparator 302 and timer circuit 303 as well as an output voltage limit signal to error amplifier 301.

In this embodiment, driver circuit 310 can receive two signals, i.e. N(off) and P(off), which are provided by a tristate signal generator 316. Signal N(off) controls the state of the NMOS switching transistors in driver circuit 310, whereas signal P(off) controls the state of the PMOS switching transistors in driver circuit 310. Specifically, during a tristate mode, the N(off) and P(off) signals are used to turn off both the NMOS and PMOS switching transistors regardless of the state of signal pfmout. Thus, tristate signal generator 316 can disable the switching regulator (wherein this feature can be used, for example, if the user wants to use another source, e.g. another switching regulator, to drive the output). When driver circuit 310 is not tristated, the signals provided by feedback loops 307 and 306 can be used to adjust the frequency and thereby the duty cycle to maintain the desired output voltage $V_{out}$ and ensure that no over-current condition exists.

Figure 3C:
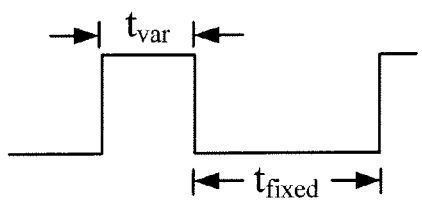
FIG. 3C illustrates an exemplary steady state waveform representative of the PFM signal output by the timer circuit.

FIG. 3C illustrates a waveform of an exemplary pfmout signal in a steady state mode. In the steady state mode, when the NMOS switching transistors of driver circuit 310 are conducting (and the PMOS switching transistors of driver circuit 310 are turned off), the pfmout signal is low for a predetermined duration $t_{fixed}$. During this time, the switching regulator is in a charge down mode or, more specifically, in a mode that allows current to be sourced from ground. In contrast, the PMOS switching transistors are conducting (and the NMOS switching transistors are turned off) during a variable time period $t_{var}$. During this time, the switching regulator is in a charge up mode. This variable time period $t_{var}$ is a function of a current limit $I_{lim}$ and the sensed current $I_{sense}$, i.e. $t_{var}=F(I_{lim}, I_{sense})$. Moreover, the current limit $I_{lim}$ is a function of the difference of a reference voltage $V_{ref}$ and the output voltage $V_{out}$, i.e. $I_{lim}=f(V_{ref}-V_{out})$. (Note that $I_{lim}$ is not defined as the above-described voltage difference during the positive limit (Plim) case, which is described below. Note further that $V_{ref}$ is the same reference voltage provided to EA 301.)

When voltage loop 307 is active and there is no over-current condition (described below), the steady state PFM duty cycle will be roughly equal to Vout/Vin, where Vout is the regulator output voltage and Vin is the regulator supply voltage. Note that this duty cycle computation is logical because LC filter 104 extracts the DC value of the PFM waveform, and the DC value of a square waveform with a duty cycle D is D*Vin. If the PFM switches or LC filter 104 has loss, then the duty cycle can slightly increase to compensate for that loss.

Note that in the steady state mode, timer circuit 303 plays a support role to PFM comparator 302, which effectively drives signal pfmout. Specifically, error amplifier 301 compares $V_{out}$ and $V_{ref}$ and provides the results of that comparison to the positive input terminal of PFM comparator 302. PFM comparator 302 receives a positive current signal psen on its negative input terminal, wherein the positive current signal psen represents the inverted waveform of the source-drain voltage of the PMOS switching transistors when they are conducting.

In one embodiment, driver circuit 310 can include an PMOS replica device that ratiometrically represents the PMOS switching transistors. That is, the process dependencies when making the switching regulator would vary similarly for the PMOS replica device and the PMOS switching transistors. In this case, if a maximum desired current through N PMOS switching transistors (of similar construction and equal size) is determined to be I, then the maximum desired current through the replica PMOS transistor is I/N. Because any conducting transistor has some resistance, it logically follows that the voltage drop across the replica PMOS transistor can be used to compute the current in the replica PMOS transistor (and thus can be scaled to represent the current in the inductor L when the PMOS switching transistors are conducting). In one embodiment, the positive current signal psen represents the waveform of the drain voltage of the PMOS replica device.

Timer circuit 303 includes a timer 314 that generates an output signal. In one embodiment, a trailing edge of signal Reset (which is generated by PFM comparator 302) triggers a negative one-shot 314A of timer 314, i.e. timer 314 generates a zero output for the period of time $t_{fixed}$. In this configuration, only when time $t_{fixed}$ is expired, can PFM comparator 302 drive signal pfmout.

Figure 4A:
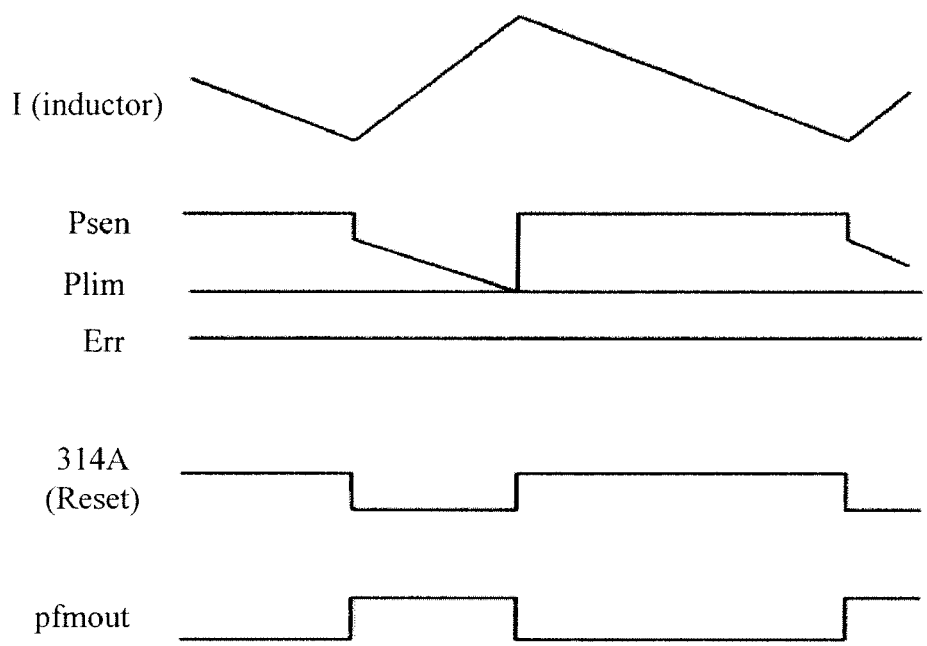
FIG. 4A illustrates various waveforms, including the positive current signal psen, using the switching regulator shown in FIG. 3B.

Error amplifier 301 and PFM comparator 302 can be configured to advantageously prevent a positive over-current condition from damaging driver circuit 310. Specifically, in this embodiment, error amplifier 301 can receive a positive threshold voltage Plim as a voltage output limit signal. In this embodiment, the positive threshold voltage Plim can be generated by driver circuit 310, wherein the positive threshold voltage Plim represents the maximum desired source-drain voltage of the PMOS switching transistors when they are conducting (or, depending on the embodiment, the maximum desired source-drain voltage of the PMOS replica device when it is conducting). Because the maximum output voltage of error amplifier 301 is set to positive threshold voltage Plim, PFM comparator 302 will receive a maximum of voltage Plim on its positive input terminal. Thus, in this configuration, PFM comparator 302 can advantageously compare the positive current signal psen with the positive threshold voltage Plim, thereby preventing a positive over-current condition from damaging driver circuit 310. FIG. 4A illustrates various waveforms, including the positive current signal psen and the positive threshold voltage Plim, when using the switching regulator shown in FIG. 3B.

A negative current limit comparator 315 and timer 312 of timer circuit 303 can also provide current limit protection for the NMOS switching transistors of driver circuit 310. To perform this function, negative current limit comparator 315 can receive a negative current signal nsen on its positive input terminal, wherein the negative current signal nsen represents the waveform of the drain voltage of the NMOS switching transistors when they are conducting.

In one embodiment, driver circuit 310 can include an NMOS replica device that ratiometrically represents the NMOS switching transistors. Note that the process dependencies when making the switching regulator would vary similarly for the NMOS replica device and the NMOS switching transistors. Thus, if a maximum desired current through N NMOS switching transistors (of similar construction and equal size) is determined to be I', then the maximum desired current through the replica NMOS transistor is I'/N. As noted above, because any conducting transistor has some resistance, it logically follows that voltage drop across the replica NMOS transistor can be used to compute the current in the replica NMOS transistor (and thus can be scaled to represent the current in the inductor L when the NMOS switching transistors are conducting). Thus, instead of measuring the voltage drop across a plurality of NMOS switching transistors, i.e. N NMOS switching transistors, driver circuit 310 can measure the voltage drop across a replica NMOS transistor. In one embodiment, negative current signal nsen represents the waveform of the drain voltage of the NMOS replica device.

Negative current limit comparator 315 further receives a negative threshold voltage Nlim on its negative input terminal. In one embodiment, the negative threshold voltage Nlim can also be generated by driver circuit 310, wherein the negative threshold voltage Nlim is a reference voltage. By comparing the negative current signal nsen with the negative threshold voltage Nlim, negative current limit comparator 315 can determine when the current in the NMOS switching transistors of driver circuit 310 is too large, i.e. exceeds a threshold represented by voltage Nlim.

Figure 4B:
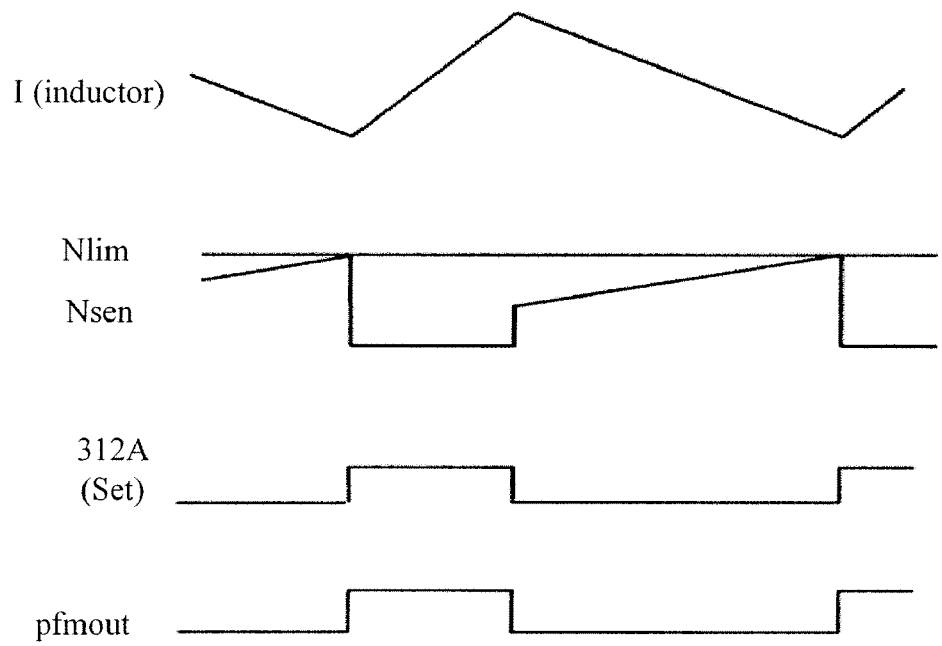
FIG. 4B illustrates various waveforms, including the negative current signal nsen, using the switching regulator shown in FIG. 3B.

In one embodiment, a leading edge of signal Set (which is generated by negative current limit comparator 316) triggers a positive one-shot 312A of timer 312, i.e. timer 312 generates a high output for a fixed period of time. This fixed-length high timing signal 312A is provided to an input terminal of OR gate 311, which in turn provides a fixed-length high pfmout signal to driver circuit 310. Driver circuit 310 can be configured such that this fixed-length high pfmout signal turns off the NMOS switching transistors (and correspondingly turns on the PMOS switching transistors) of driver circuit 310 for that same fixed period of time. In this manner, a lower bound on the output duty cycle of driver circuit 310 can be established. FIG. 4B illustrates various waveforms, including the negative current signal nsen and the negative threshold voltage Nlim, when using the switching regulator shown in FIG. 3B.

Thus, as described above, when there is an over-current condition (positive or negative), the control circuit can produce an output that opposes the over-current. That is, generally, if timer circuit 303 asserts driver circuit 310 and the current flowing from the PMOS switching transistors into the inductor L exceeds the over-current threshold Plim, then driver circuit 310 is de-asserted for another or the same fixed period of time. On the other hand, if timer circuit 303 de-asserts driver circuit 310 and the current flowing from the inductor L into the NMOS switching transistors exceeds the over-current threshold Nlim, then driver circuit 310 is asserted for the same fixed period of time.

This over-current (positive and negative) protection acts to limit the peak current in the inductor L and prevent damage to driver circuit 310 from electrical over-stress. Specifically, the described over-current protection can advantageously decrease the duty cycle when there is a positive over-current (i.e. a current that is charging capacitor C of LC filter 104) and increase the duty cycle when there is a negative over-current (i.e. a current that is discharging the capacitor C).

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A switching regulator comprising:
    a driver circuit for receiving a pulse frequency modulation (PFM) signal and responding by turning on a set of first type switching transistors and turning off a set of second type switching transistors;
    an error amplifier for receiving a first reference voltage and a voltage control loop signal on its input terminals as well as a voltage limit signal on a control terminal, the voltage limit signal setting a maximum output voltage of the error amplifier, the voltage limit signal being a first current control loop signal generated by the driver circuit;
    a PFM comparator for receiving an output of the error amplifier and a second current control loop signal generated by the driver circuit;
    a timer circuit for receiving a reset signal generated by the PFM comparator and other current control loop signals generated by the driver circuit, the timer circuit generating the PFM signal based on a steady state mode and at least one of a positive over-current condition and a negative over-current condition; and
    an LC filter for receiving an output of the driver circuit and generating the voltage control loop signal.

2. The switching regulator of claim 1, wherein the error amplifier and the PFM comparator determine the positive over-current condition.

3. The switching regulator of claim 2, wherein the timer circuit includes:
    a first timer for receiving the reset signal;
    a negative current limit comparator for receiving the other current control loop signals, which are used to determine the negative over-current condition;
    a second timer for receiving a set signal generated by the negative current limit comparator; and
    a set of logic gates for receiving outputs of the first and second timers and generating the PFM signal.

4. The switching regulator of claim 3, wherein the first and second timers generate one-shot signals when triggered.

5. A method of providing current mode pulse frequency modulation for a switching regulator, the method comprising:
    resetting a driver input signal for a fixed duration when a first current in a driver reaches a first value set by one of:
        an error amplifier output; and
        at least one of a positive over-current condition and a negative over-current condition,
    the first current being associated with a set of first type switching transistors in the driver,
    wherein resetting the driver input includes comparing the error amplifier output with a first-type current signal associated with the set of first type switching transistors in the driver, a maximum value of the error amplifier output being set by a voltage limit signal, the voltage limit signal being a first current control loop signal generated by the driver.

6. The method of claim 5, further including setting the driver input signal for the fixed duration when a second current in the driver reaches a second value, the second current being associated with a set of second type switching transistors in the driver.

7. The method of claim 6, wherein the driver generates the second value.

8. The method of claim 6, further including tristating the driver to ignore both resetting and setting.

9. A switching regulator comprising:
   a driver circuit for receiving a pulse frequency modulation (PFM) signal and responding by turning on a set of first type switching transistors and turning off a set of second type switching transistors;
   an error amplifier for receiving a first reference voltage and a voltage control loop signal on its input terminals as well as a voltage limit signal on a control terminal, the voltage limit signal setting a maximum output voltage of the error amplifier, the voltage limit signal being a first current control loop signal generated by the driver circuit;
   a PFM comparator for receiving an output of the error amplifier and a second current control loop signal generated by the driver circuit;
   a timer circuit for receiving a reset signal generated by the PFM comparator and other current control loop signals generated by the driver circuit; and
   an LC filter for receiving an output of the driver circuit and generating the voltage control loop signal, wherein a measured voltage drop associated with the set of first type switching transistors when turned on provides current sensing of an inductor of the LC filter.

10. The switching regulator of claim 9, wherein the driver circuit includes a replica device formed with substantially the same semiconductor process as and having a scaled area compared to the set of first type switching transistors, and wherein the measured voltage drop associated with the set of first type switching transistors when turned on is a voltage drop across the replica device when conducting.

* * * * *